United States Patent [19]

Beck et al.

[11] 3,890,337
[45] June 17, 1975

[54] α,α,α-TRIFLUORO-2-NITRO-6-[OXA(THIA)ZOLYL]THIO-P-TOLUNITRILES

[75] Inventors: James R. Beck, Indianapolis; Robert G. Suhr, Greenfield, both of Ind.

[73] Assignee: Eli Lilly and Company, Indianapolis, Ind.

[22] Filed: Nov. 23, 1973

[21] Appl. No.: 418,512

[52] U.S. Cl.... 260/302 S; 260/306.6 R; 260/307 R; 260/307 D; 424/270; 424/272
[51] Int. Cl. ...................... C07d 91/32; C07d 85/44
[58] Field of Search...... 260/306.6 R, 302 S, 307 D, 260/307 R

[56] References Cited
UNITED STATES PATENTS

| | | | |
|---|---|---|---|
| 2,862,000 | 11/1958 | Hoininger et al. | 260/302 S |
| 3,491,102 | 1/1970 | O'Shea et al. | 260/306.6 R |

*Primary Examiner*—Richard J. Gallagher
*Attorney, Agent, or Firm*—Dwight E. Morrison; Everet F. Smith

[57] ABSTRACT

There are disclosed novel α,α,α-trifluoro-2-nitro-6-[oxa(thia)zolyl]thio-p-tolunitriles prepared from α,α,α-trifluoro-2,6-dinitro-p-tolunitrile by the nitro displacement reaction. The novel compounds possess herbicidal, antifungal, antibacterial, and antiprotozoal properties.

7 Claims, No Drawings

α,α,α-TRIFLUORO-2-NITRO-6-[OXA(THIA)-ZOLYL]THIO-P-TOLUNITRILES

BACKGROUND OF THE INVENTION

1. Field of the Invention

This invention relates to α,α,α-trifluoro-2-nitro-6-[oxa(thia)zolyl]thio-p-tolunitriles prepared from α,α,α-trifluoro-2,6-dinitro-p-tolunitrile by displacement of one of the nitro groups by nucleophiles, which in the present instance are thiol anions.

2. Description of the Prior Art

In the prior art, the nucleophilic lability of activated nitro groups has been described by Bunnett et al., *J. Am. Chem. Soc.*, 79, 385 (1957), and by Bolto et al., *Australian J. Chem.*, 9, 74 (1956).

There are numerous examples in the chemical literature of activated nitro displacements in substituted benezenes, although most cases involve intramolecular displacement. See for example, T.W.M. Spence and G. Tennant, *J. Chem. Soc., Perkins Trans.*, 1, 835 (1972).

An example of an intermolecular displacement is provided by the synthesis of 2,6-dimethoxybenzonitrile from m-dinitrobenzene, as reported by A. Russell et al., "Organic Syntheses," Coll, Vol. III, p. 293 (John Wiley and Sons, Inc., New York, N.Y., 1955). The preparation is accomplished in two steps. First, the m-dinitrobenzene is dissolved in methanol and allowed to react with potassium cyanide. In the second step, the 2-nitro-6-methoxybenzonitrile obtained in the first step is refluxed with a solution of potassium hydroxide in methanol to yield 2,6-dimethoxybenzonitrile in 15–17 percent overall yield. No utility is alleged for the compound by these authors.

SUMMARY OF THE INVENTION

This invention relates to α,α,α-trifluoro-2-nitro-6-[oxa(thia)zolyl]thio-p-tolunitriles prepared by displacement of a nitro group of α,α,α-trifluoro-2,6-dinitro-p-tolunitrile. The novel compounds are active as herbicidal, fungicidal, antibacterial, and antiprotozoal agents.

DESCRIPTION OF THE PREFERRED EMBODIMENT

The novel compounds of this invention are of a class having the formula

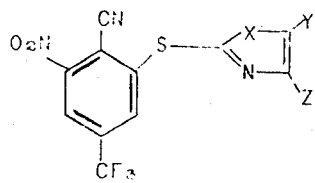

wherein

X is oxygen or sulfur;

Y and Z, when taken separately, are the same or different, and are hydrogen or phenyl; and Y and Z, when taken together with the carbon atoms to which they are attached, form a benzene ring or mono-halogensubstituted benzene ring.

Halogen can be illustratively bromine, chlorine, iodine, or fluorine.

These novel compounds variously possess activity as postemergent herbicides, plant fungicides, and as antibacterial and antiprotozoal agents.

Thus, the novel compounds of this invention have shown in vitro antibacterial activity when tested against *Staphylococcus aureus* 3055, *Erwinia amylovora*, and *Streptococcus faecalis* at rates of about 10 to 100 mcg./ml.

In vitro activity against *Trichophyton mentagrophytes*, the causative organism of athletes foot, at rates of about 10 to 100 mcg./ml., has been shown by 2-[(2-benzothiazolyl)thio]α,α,α-trifluoro-6-nitro-p-tolunitrile, 2-[(5-chloro-2-benzoxazolyl)-thio]α,α,α-trifluoro-6-nitro-p-tolunitrile, and 2-[(5-chloro-2-benzothiazolyl)thio]α,α,α-trifluoro-6-nitro-p-tolunitrile.

In addition, 2-[(2-benzoxazolyl)thio]-α,α,α-trifluoro-6-nitro-p-tolunitrile has shown some postemergent herbicidal activity at an application rate of 8 lbs./acre. The same compound is active as an antifungal agent against tomato late blight at an application rate of 400 ppm.

The compound 2-[(5-chloro-2-benzoxazolyl)thio]α,α,α-trifluoro-6-nitro-p-tolunitrile has also shown in vitro antiprotozoal activity against *Trichomonas vaginalis* and *Euglena gracilus* in a plate test at 40 mcg./6.25 mm. disc.

A number of the compounds, including 2-[(2-benzothiazolyl)thio]α,α,α-trifluoro-6-nitro-p-tolunitrile, 2-[(2-benzoxazolyl)thio]α,α,α-trifluoro-6-nitro-p-tolunitrile, and α,α,α-trifluoro-2-nitro-6-[(4-phenyl-2-thiazolyl)thio]-p-tolunitrile, are active as antifungal agents in vitro against *Botrytis cinerea*, the causative agent of grey mold, at an application rate of 400 ppm.

Preparation of the novel compounds is carried out by allowing α,α,α-trifluoro-2,6-dinitro-p-tolunitrile to react with an excess of one of the thiols of the formula

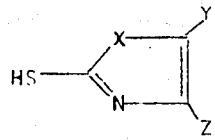

wherein X, Y, and Z, have the same meanings as set forth hereinabove, in a suitable solvent, in the presence of a suitable base, at a temperature of from about 0° to about 100°C. The reaction time can vary from about 1 hour to about 6 hours. Suitable solvents include methanol, aqueous dimethylformamide, a mixture of methanol and dimethylformamide, and the like. Suitable bases include potassium hydroxide, sodium hydroxide, and the like.

Thus, the reaction is accomplished by suspending or dissolving α,α,α-trifluoro-2,6-dinitro-p-tolunitrile in a suitable solvent, such as dimethylformamide, together with a base, for example potassium hydroxide, and a nucleophile, for example, 2-mercaptobenzoxazole. The resulting mixture is stirred at about ambient room temperature for a time sufficient to allow substantial completion of the displacement reaction, in the present instance about 3 hours. The reaction product mixture is worked up by pouring it into a stirred mixture of ice and water. The solid material which precipitates is filtered off and the filtrate discarded. The solid is purified by recrystallization from a suitable solvent, for example a mixture of acetonitrile and commercial 95 percent ethanol. The crystalline product obtained is identified by elemental analyses and NMR spectra. In the instant illustrative example, the product is 2-[(2-benzoxazolyl)thio]-α,α,α-trifluoro-6-nitro-p-tolunitrile.

Suitable thiols for use in carrying out the displacement reaction to prepare the novel compounds of this invention include 2-mercaptobenzoxazole, 2-mercaptobenzothiazole, 5-chloro-2-mercaptobenzoxazole, 5-chloro-2-mercaptobenzothiazole, 2-mercapto-4,5-diphenyloxazole, 2-mercapto-4-phenylthiazole, and the like, all of which are commercially available.

The α,α,α-trifluoro-2,6-dinitro-p-tolunitrile used in the synthesis of the novel compounds is prepared according to the procedure set forth by Beck, *J. Org. Chem.* 37, 3224 at 3226 (1972).

The following examples illustrate the preparation of novel compounds of the invention, but are not to be construed as limiting the scope of the invention.

EXAMPLE 1

2-[(2-Benzoxazolyl)thio]-α,α,α-trifluoro-6-nitro-p-tolunitrile

A mixture of 3.1 g. of 2-mercaptobenzoxazole, 5.22 g. of 2,6-dinitro-4-trifluoromethylbenzonitrile, and 1.40 g. of potassium hydroxide, in 100 ml. of dimethylformamide was stirred at ambient room temperature for about 3 hours. At the end of that time, the reaction product mixture was poured into a mixture of ice and water. The solid material which precipitated was filtered off and the filtrate discarded. The solid material was recrystallized from a mixture of acetonitrile and 95 percent ethanol to yield crystalline product having a melting point of about 98°–101°C., and weighing about 5.6 g. The product was identified by elemental analyses and NMR spectrum as 2-[(2-benzoxazolyl)thio]-α,α,α-trifluoro-6-nitro-p-tolunitrile.

Following the same general procedure and using appropriate starting materials, the following additional compounds were prepared:

2-[(2-Benzothiazolyl)thio]-α,α,α-trifluoro-6-nitro-p-tolunitrile, having a m.p. of about 143°–145°C., identified by elemental analyses and NMR spectrum.

2-[(5-Chloro-2-benzoxazolyl)thio]-α,α,α-trifluoro-6-nitro-p-tolunitrile, having a melting point of about 104°–106°C., identified by elemental analyses and NMR spectrum.

2-[(5-Chloro-2-benzothiazolyl)thio]-α,α,α-trifluoro-6-nitro-p-tolunitrile, having a melting point of about 105°–107°C., identified by elemental analyses and NMR spectrum.

α,α,α-Trifluoro-2-nitro-6-[(4-phenyl-2-thiazolyl)thio]-p-tolunitrile, having a melting point of about 113°–116°C., identified by elemental analyses and NMR spectrum.

2-[(4,5-Diphenyl-2-oxazolyl)thio]-α,α,α-trifluoro-6-nitro-p-tolunitrile, having a melting point of about 125°–127°C., identified by elemental analyses and NMR spectrum.

By virtue of their properties, the novel compounds of this invention have several uses. Those which have antibacterial properties can be used at suitable concentrations in aqueous solutions to disinfect laboratories, workbenches, and the like.

Those with the particular antifungal activity can be used in combatting athletes foot, while the compounds active against *Botrytis cinerea* can be used by those skilled in the art to control grey mold, for instance, on grapes.

We claim:
1. A compound of the formula

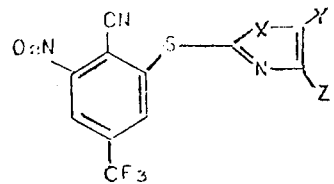

wherein
X is oxygen or sulfur;
Y and Z, when taken separately, are the same or different, and are hydrogen or phenyl; and
Y and Z, when taken together with the carbon atoms to which they are attached, form a benzene ring or mono halogensubstituted benzene ring.

2. A compound as in claim 1, said compound being 2-[(2-benzothiazolyl)thio]-α,α,α-trifluoro-6-nitro-p-tolunitrile.

3. A compound as in claim 1, said compound being 2-[(2-benzoxazolyl)thio]-α,α,α-trifluoro-6-nitro-p-tolunitrile.

4. A compound as in claim 1, said compound being 2-[(5-chloro-2-benzoxazolyl)thio]-α,α,α-trifluoro-6-nitro-p-tolunitrile.

5. A compound as in claim 1, said compound being 2-[(5-chloro-2-benzothiazolyl)thio]-α,α,α-trifluoro-6-nitro-p-tolunitrile.

6. A compound as in claim 1, said compound being α,α,α-trifluoro-2-nitro-6-[(4-phenyl-2-thiazolyl)thio]-p-tolunitrile.

7. A compound as in claim 1, said compound being 2-[(4,5-diphenyl-2-oxazolyl)thio]-α,α,α-trifluoro-6-nitro-p-tolunitrile.

* * * * *